Sept. 3, 1968      W. K. FRENCH      3,400,365
MAGNETIC VEHICLE DETECTOR WITH FEEDBACK
ADJUSTMENT FOR AMBIENT CONDITIONS
Filed Dec. 30, 1964      2 Sheets-Sheet 1
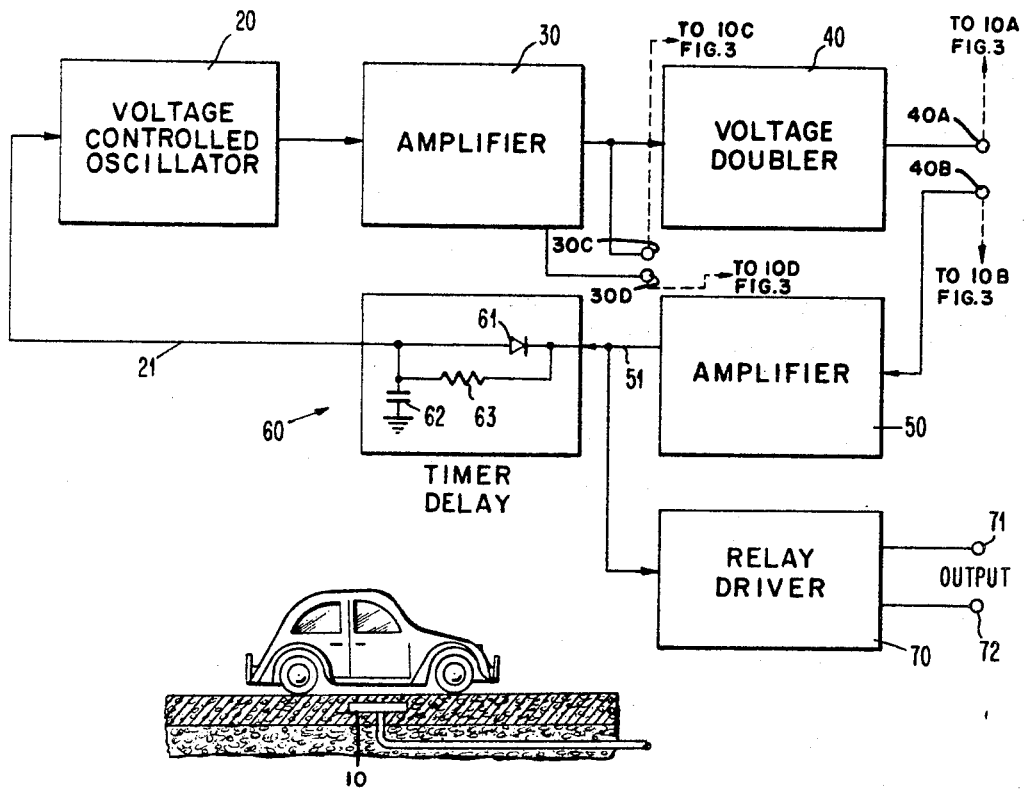
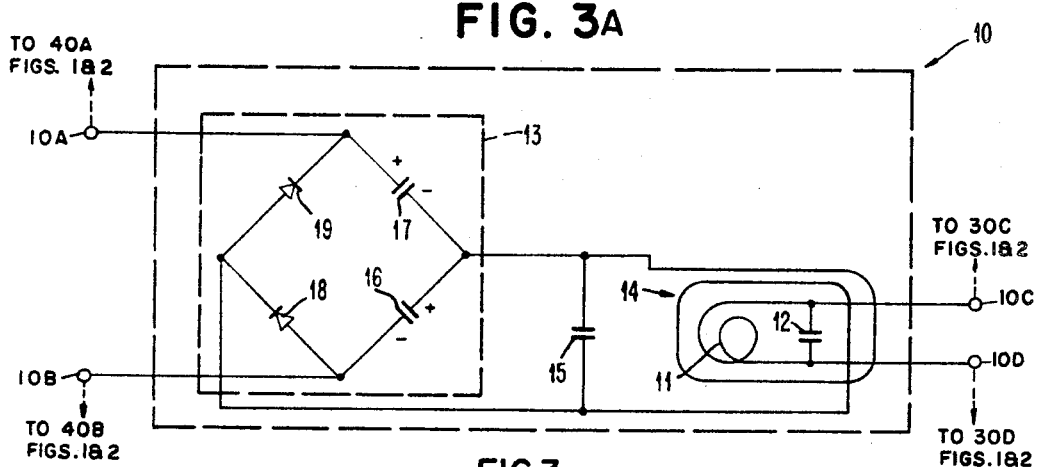
INVENTOR
WALTER K. FRENCH
BY *Robert E. Sandt*
AGENT Sept. 3, 1968 W. K. FRENCH 3,400,365
MAGNETIC VEHICLE DETECTOR WITH FEEDBACK
ADJUSTMENT FOR AMBIENT CONDITIONS
Filed Dec. 30, 1964 2 Sheets-Sheet 2

United States Patent Office 3,400,365
Patented Sept. 3, 1968

3,400,365
MAGNETIC VEHICLE DETECTOR WITH FEEDBACK ADJUSTMENT FOR AMBIENT CONDITIONS
Walter K. French, Montrose, N.Y., assignor to International Business Machines Corporation, New York, N.Y., a corporation of New York
Filed Dec. 30, 1964, Ser. No. 422,315
6 Claims. (Cl. 340—38)

ABSTRACT OF THE DISCLOSURE

A small transmitting coil energized from a voltage-controlled variable frequency oscillator, which produces a concentrated substantially vertical magnetic field, and a large loosely-coupled receiving coil connected in a circuit resonant at a frequency higher than the highest frequency of the oscillator provides a sensitive magnetic vehicle detector when these coils are buried beneath the vehicular roadway. Any metal entering the flux field reduces the voltage output of the receiver to initiate a count. Persistence of metal produces a feedback to raise the oscillator frequency to restore the output of the receiver to compensate for metal trash or parked vehicles.

---

Figure 2:
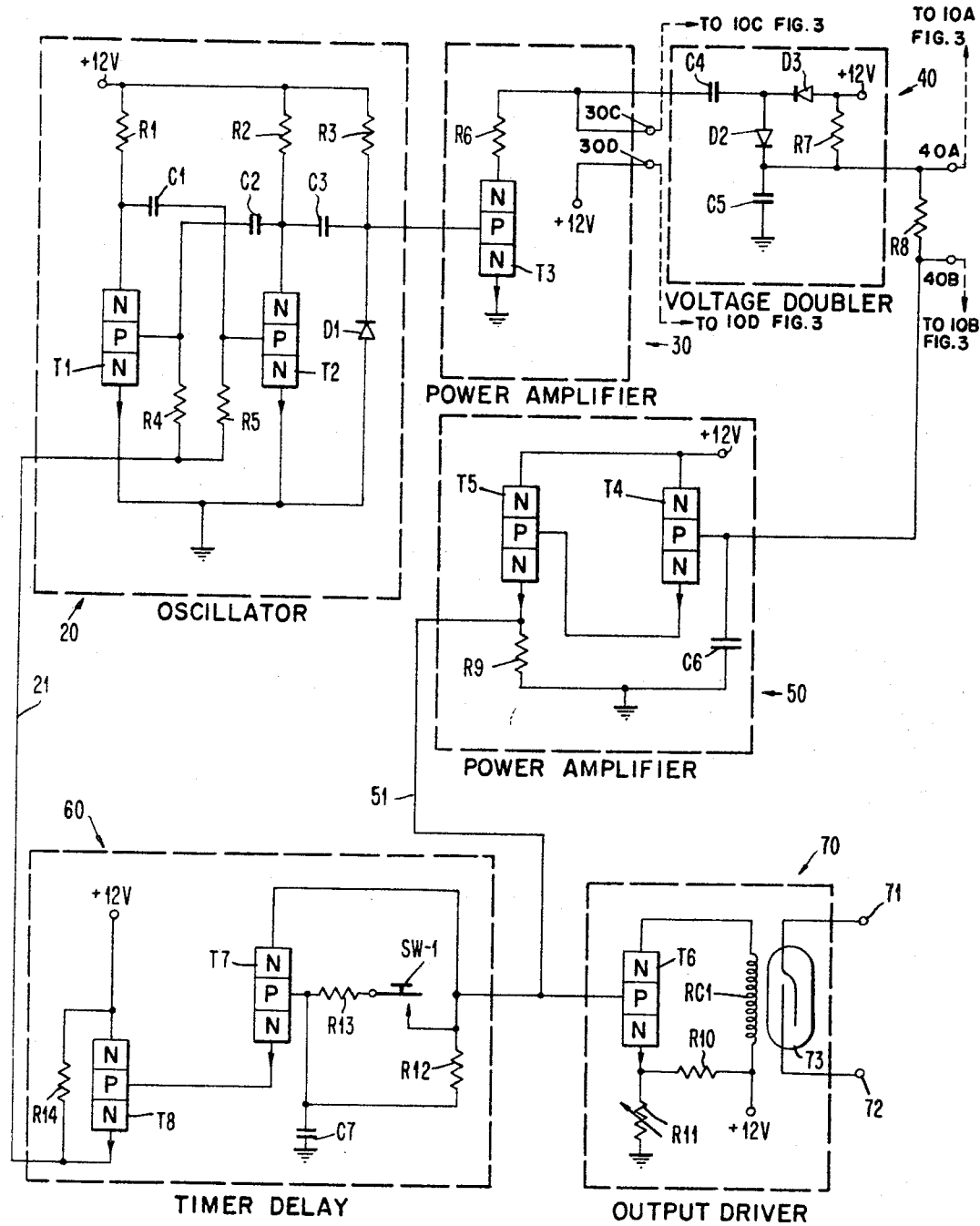

This invention relates to metal detectors, and more particularly to an apparatus for detecting the presence of automotive type vehicles in a roadway.

The presence of automotive vehicles may be detected by photocells and light beams, by treadles, by radar devices, by sonic waves, and by magnetic field effects. The present invention relates to the last-named of these. It produces a magnetic field which, when intercepted by a vehicle, effects the coupling to a receiving coil to yield a signal indicating the presence of the vehicle.

The invention overcomes the drawbacks of prior art devices which necessarily have employed very large buried detectors. Not only have these detectors been inconvenient to install, because of their size, but also because they have been incapable of distinguishing between closely spaced vehicles. A string of cars through a toll booth would be counted as one, a certain temptation to the honesty of the attendant. The instant invention is capable of distinguishing between two compact foreign cars, even when one is pushing the other. It will produce a count of two vehicles in this extreme circumstance.

The prior art magnetic detectors have frequently been insensitive to plastic body sports cars, as they have contained insufficient metal. The magnetic detector of this invention will detect sports cars with plastic bodies as it will operate in response to a relatively small flat metal plate, such as the bottom of the crankcase pan. Prior art detectors have experienced difficulty in detecting trucks with very high bodies as the magnetic field have not been sufficiently focused to intercept and interact with so remote a body with reliable signal intensity response.

Finally, prior art devices have been incapable of compensating for proximate magnetic bodies, other than the vehicle to be detected. Adjacently parked cars, and metal trash in the roadway all have affected prior art devices adversely. Many of these devices have required that the vehicle move rapidly into the field and have been unable to detect very slowly moving vehicles. The present invention overcomes this failing by providing a closed feedback loop that automatically adjusts the circuit parameters to compensate for long term perturbations in the system.

The invention has, therefore, as an object the provision of a magnetic vehicle detector with a feedback loop for compensating for long term perturbations in the system.

Another object is to provide a magnetic vehicle detector having a very small radiator for producing a substantially vertically oriented magnetic field and a loosely coupled receiver coil surrounding the radiator, wherein the presence of a vehicle effectively decouples the radiator and receiver.

A further object of the invention is to provide a magnetic vehicle detector having a transmitter coil emitting an alternating magnetic field of fixed frequency and a receiving coil tuned to a resonant frequency higher than the fixed frequency, the geometry and relative disposition of the two coils being such that the presence of a vehicle diminishes the induced voltage response in the receiver coil.

The foregoing and other objects, features and advantages of the invention will be apparent from the following more particular description of a preferred embodiment of the invention, as illustrated in the accompanying drawings.

In the drawings:
FIG. 1 is a schematic flow diagram demonstrating the broad principles of the invention.
FIG. 2 is a detailed circuit diagram of the detector circuits.
FIG. 3 shows details of the loop assembly buried in a roadway.
FIG. 3A shows the location of the buried loop assembly of FIG. 3 in the roadway.

The vehicle detector consists essentially of two remotely disposed units, the buried loop assembly 10, shown in FIGS. 3 and 3A, and the driving and detection circuitry shown schematically in FIG. 1, and in detail in FIG. 2. It detects vehicles by establishing an electromagnetic field by means of an oscillator and a radiating coil. This field is loosely coupled to a large receiving coil which surrounds the transmitter coil and is tuned to a frequency higher than the frequency of the radiated signal. When a vehicle passes over the buried loop, the magnetic flux lines intersect the underside of the vehicle, setting up eddy currents therein and distorting the flux lines to decrease the signal level in the receiver coil. This decrease in receiver coil signal causes the detector circuits to operate to count the car or to trip a signal, and also to initiate action of a feedback loop to restore the unbalance caused by the presence of the vehicle. If the perturbation is transistory, the feedback loop, being slow-acting, has insufficient time to operate and the vehicle is counted. If the presence of a vehicle persists, or the same circuit effects are produced by trash in the street, the feedback loop readjusts the system to compensate.

In more detail, the buried loop assembly consists of a very small transmitter coil surrounded by a very large receiver coil loosely coupled to the transmitter coil. Both coils are buried in the pavement. As shown in FIG. 3, the transmitter coil 11, having the terminals 10C and 10D, is shunted with a capacitor 12 tuned to present a maximum effective circuit impedance as seen from the line so as to minimize the necessary driving power. This adjustment is made for a nominal operating frequency of 20 kc. The coil itself consists of 100 turns of 26 gauge insulated wire wound on a ferrite tube 2.165" long, by .161" O.D., by .079" I.D.

The receiving coil 14 is tuned by the capacitor 15 to resonate at a frequency higher than the 20 kc. operating frequency, and, in fact, in excess of the highest frequency, the apparatus might attain under the most severe operating conditions. The coil 14 is a square 20" on a side and consists of 75 turns of 18 gauge wire, heated to fuse the plastic insulation thereon to achieve a form of encapsulation. The receiver coil 14, transmitter coil 12, together with their trimming capacitors and the voltage doubler 13, are buried in the street about three inches below the surface. The axes of the two coils are vertical, and the transmitter coil disposed in the middle of the receiver coil.

The voltage doubler 13, consisting of the capacitors 16 and 17, and diodes 18 and 19, acts as a full wave rectifier and voltage doubler for the AC waveform induced in the receiver coil 14. When the AC waveform achieves that phase relationship in the coil 14 as to make the upper leg thereof positive with respect to the lower leg, current will flow through capacitor 16 and diode 18 to the lower less negative leg of the coil, thus charging capacitor 16 with a relatively negative potential toward terminal 10B. When the reverse phase exists in coil 14, current flows from the lower coil leg through diode 19 to capacitor 17 and the upper leg of coil 14. Capacitor 17 thus becomes charged with the more positive potential toward the terminal 10A. Therefore, as between the terminals 10A and 10B, the coil 14, under the radiation influence of the transmitter coil 11, will cause the terminal 10A to be positive with respect to terminal 10B. Thus, when a car passes over the loop and the voltage of coil 14 decreases, the potential difference between 10A and 10B will decrease. However, the potential of 10B will grow less negative, or more positive. It is this increase in the positive potential of terminal 10B that is processed by the circuits to be described.

Returning now to FIG. 1, oscillator 20 generates a signal of approximately 20 kc. which is amplified in amplifier 30 and fed via terminals 30C, 10C, 30D, and 10D to energize the transmitter coil 11 in the roadway. The AC waveform from amplifier 30 also feeds the voltage doubler 40 which produces a positive potential on terminal 40A. This positive potential opposes that produced by the receiver coil 14 in its voltage doubler 13. 10B and 40B, therefore, will, in the absence of a vehicle, reside at, or slightly above, ground level, because the two voltage doubler circuits 40 and 13 are effectively connected in series opposition. Thus, when the coil 14 decreases its output in the presence of a vehicle (or trash in the street) terminals 10B and 40B use in potential.

The rise in potential of terminals 10B and 40B, amplified in amplifier 50 (without inversion) energizes the relay driver 70 to actuate the relay contacts therein to provide a vehicle presence output response on terminals 71 and 72. This same increase in potential on line 51, is blocked by diode 61, but fully absorbed as voltage drop across resistor 63, the capacitor 62 resisting any sudden increase in potential. Thus, line 21 experiences no substantial increase in potential upon the initial onset of a vehicle.

If a car tarries over the buried loop, parks in the vicinity thereof, or if metallic trash is thrown into the roadway and remains there, the increase in potential on line 51 will be more than transitory. If it persists, the capacitor 62 will charge up toward the level of the line 51 through resistor 63. However, as the capacitor 62 charges, line 21 increases in potential to increase the frequency of the oscillator 20. Since the receiver circuit resonates at a frequency higher than the oscillator frequency, this increase in frequency in the direction toward resonance will increase the voltage response of coil 14 to lower the potential of terminals 10B and 40B. Thus, the system is restabilized for each long term change in system parameters, however caused.

When a long delaying vehicle (or trash) passes out of the loop influence, coil 14 will increase its output, making terminal 10B (and 40B) less positive. Capacitor 62 will now discharge rapidly through diode 61 to the new level of line 51. The potential of line 21 will follow the potential of the capacitor and reduce the frequency of oscillator 20 to decrease the response of coil 14 and increase the potential of terminal 10B. This feedback effect, like the reverse, is obviously not serial, but simultaneous. The effect is one of seeking to maintain the status quo by resisting the change through feedback. Actually, in true servo-fashion, the final equilibrium state is a compromise of two opposing effects. In one instance, there is a time delay and in the other, the restoration is effectively instantaneous.

Before proceeding with a brief examination of the detailed circuit diagram of FIG. 2, it is well to pause and examine the theory of operation. It is desirable that the transmitter coil be as small as possible and loosely coupled to the receiver coil. The receiver coil is tuned to resonate at a frequency higher than the signal frequency. When a vehicle passes over the buried loops, it is detected because there is present in the vehicle a sheet of magnetic material parallel to the plane of the coil. This sheet in the presence of the coils will distort the magnetic flux lines so as to bring lines which were formerly outside of the receiver loop within the loop to cause a decrease in the receiver loop response. A second effect, which comes into play, is the production of eddy currents within the vehicle structure by the radiated AC field. These eddy currents cause an increase in the resonant frequency of the receiver loop. Since the loop was initially tuned to resonate above the signal frequency, this eddy current effect in raising the resonant frequency will cause the amplitude of the voltage waveform induced in the receiver to diminish further. The combination of these two effects will yield voltage changes as substantial as 20%.

Turning now to FIG. 2, the voltage controlled oscillator 20 is a free-running multivibrator having cross-coupling between the transistors T1 and T2, wherein they conduct alternately, and the conduction of one cuts off the other. Instead of returning the bases to ground, as is conventional in circuits of this nature, they are returned via resistors R4 and R5 to the line 21 which is maintained in the vicinity of +2.5 volts by the feedback. The output from the oscillator is taken via capacitor C3 from the collector load resistor R2.

The power amplifier 30 employs the single transistor T3 with the transmitter coil terminals 10C and 10D serially connected between the source of positive potential and the collector load resistor R6. Terminal 30C also connects with the voltage doubler 40 via coupling capacitor C4. This voltage doubler charges the capacitor C5 to a potential value in the region of +30 volts. Terminal 40A, therefore, is more positive than the +12 volt power supply.

The bucking action achieved by connecting the voltage doubler 13 (FIG. 3) in opposition to the doubler 40 has already been discussed. The result of this is a potential level near or slightly above ground on the terminals 10B and 40B. This level when applied to the amplifier 50 produces a positive voltage in line 51, the amplifier 50 producing no inversion.

When in the presence of a vehicle, terminals 10B and 30B increase in potential, line 51 also increases through the emitter follower action of amplifier 50. The increase in line 51 causes transistor T6 to conduct sufficiently to energize the coil RC1 of the reed type relay 73 to produce the output on terminals 71 and 72 to operate a counter or actuate a traffic control signal.

The increase on line 51 also starts the charging action previously described with respect to FIG. 1. The RC circuit now consists of R12 and C7. As C7 increases in charge, the voltage increase produces a corresponding increase in the line 21 through action of transistors T7 and T8. When the potential of line 51 suddenly falls after a prolonged elevation, the capacitor C7 should discharge immediately. This discharge was effected in the schematic showing of FIG. 1 by diode 61. In the actual circuit of FIG. 2, capacitor C7 discharges through transistor T7 when the potential of the collector suddenly drops so as to force all of the current flow through the base at the expense of the charge on C7. Thus, the timer delay circuit 60 functions in the same manner as the schematic circuit of FIG. 1. It raises the potential of line 21 only after a prolonged increase in the potential of line 51. It decreases the potential of line 21 rapidly to follow a rapid decrease in the potential of line 51. The resistor R13 and switch SW–1 form no part of the normal operating circuit. They are present for the sole convenience of a maintenance man who can apply a short time constant to the RC circuit by shunting the resistor R13 with R12.

Exemplary circuit parameters for the circuit illustrated in FIG. 2 for the geometry of the coils as set forth are as follows:

| | | |
|---|---|---|
| R1 | ohms | 50,000 |
| R2 | do | 13,000 |
| R3 | do | 100,000 |
| R4 | do | 150,000 |
| R5 | do | 150,000 |
| R6 | do | [1] 100,000 |
| R7 | megohms | 5 |
| R8 | do | 5 |
| R9 | ohms | 50,000 |
| R10 | do | [1] 300 |
| R11 | do | [2] 100 |
| R12 | megohms | 2 |
| R13 | ohms | 1,000 |
| R14 | do | 500,000 |
| C1 | farads | 67$\mu\mu$ |
| C2 | do | 68$\mu\mu$ |
| C3 | do | .0025$\mu$ |
| C4 | do | .01$\mu$ |
| C5 | do | .01$\mu$ |
| C6 | do | .1$\mu$ |
| C7 | do | [3] 220$\mu$ |

[1] Watt. [2] Variable. [3] 10 volt.

All resistors are ¼ watt, except as noted.
All transistors are NPN junction transistors.

In retrospect, it will be appreciated that this invention provides a magnetic vehicle detector which is capable of distinguishing between two vehicles when one is pushing the other. It further is capable of detecting the presence of a modern automobile, having a plastic body, as well as a very high-slung vehicle such as a cement mixer truck. Additionally, the detector is unaffected by structural discontinuities, such as axles, in a vehicle, and will only count once per vehicle. Finally, the detector, through its feedback loop, will readjust for cars parked in the vicinity of the loop and for trash in the street.

While the invention has been particularly shown and described with reference to a preferred embodiment thereof, it will be understood by those skilled in the art that various changes in form and details may be made therein without departing from the spirit and scope of the invention.

What is claimed is:
1. A vehicle detector, comprising:
 (a) means for producing an alternating magnetic field of a given frequency in a volume of space and adapted to be included within a roadway upon which vehicles travel;
 (b) receiving means coupled to said alternating magnetic field and including capacitive and inductive elements connected in a circuit tuned to a resonant frequency different from said given frequency physically positioned within said volume of space and operative responsive to said alternating magnetic field to yield a substantially steady voltage output in the absence of a vehicle greater than the voltage response in the presence of a vehicle in said space, and
 (c) means responsive to the change in voltage output of said receiving means for manifesting the presence of a vehicle in said space.

2. The vehicle detector of claim 1 wherein said means for producing an alternating magnetic field comprises an oscillator and a coil of small dimensions coupled to said oscillator and disposed within the roadway.

3. The vehicle detector of claim 1 wherein said means for producing an alternating magnetic field comprises an oscillator and a coil of small dimensions coupled to said oscillator and said receiving means comprises a coil of substantially larger dimensions surrounding said field-producing coil and capacitive and inductive elements being tuned to resonate at a frequency higher than the given frequency.

4. A vehicle detector, comprising:
 (a) means including a variable frequency oscillator for producing an alternating magnetic field of a given frequency in a volume of space and adapted to be included within a roadway upon which vehicles travel;
 (b) receiving means coupled to said alternating magnetic field and including capacitive and inductive elements connected in a circuit tuned to a resonant frequency different from said given frequency physically positioned within said volume of space and operative responsive to said alternating magnetic field to yield a steady voltage output response in the absence of a metallic vehicle greater than the voltage response in the presence of a vehicle in said space the presence of a vehicle in said space causing said magnetic field to intersect the underside of said vehicle to decrease the signal level in said receiving means;
 (c) means responsive to a relatively steady decrease in the voltage response of said receiving means for altering the frequency of said oscillator in a direction to decrease the difference between the resonant frequency of the receiver and the oscillator frequency; and
 (d) means responsive to the decrease in voltage output from said receiving means for manifesting the presence of a vehicle in said space.

5. A vehicle detector, comprising:
 (a) a variable frequency oscillator operable responsive to the level of control potential to change its operating frequency;
 (b) a coil of small dimensions connected to said oscillator and operative responsive thereto to produce an alternating magnetic field in the volume of space and adapted to be included within a roadway upon which vehicles travel;
 (c) a receiving coil of substantially larger dimensions than said small dimensions coil surrounding said last-named coil and operative responsive to the field produced thereby to yield a voltage output in the presence of a vehicle less than the output in the absence of a vehicle in said volume of space, the said receiving coil having means associated therewith for producing a circuit resonant at a frequency higher than the frequency of said oscillator;
 (d) means responsive to a substantially steady decrease in the voltage output from said receiving coil for altering the control potential on said oscillator to increase the operating frequency thereof to restore the output of said receiving coil;
 (e) means responsive to a rapid increase in the output response of said receiving coil for altering the control potential on said oscillator to decrease the operating frequency thereof to restore the output response of said receiving coil; and
 (f) means responsive to the decrease in the output response of said receiving coil for indicating the presence of a vehicle in said space.

6. A magnetic vehicle detector, comprising:
 (a) a voltage controlled variable frequency oscillator operable responsive to the magnitude of a control voltage to produce a variable frequency output waveform in the order of magnitude of 20,000 cycles per second;
 (b) a transmitting coil of small dimensions wound upon a core of magnetic material, connected to and energized by said oscillator, and embedded in a roadway upon which vehicles travel;

(c) a receiving coil embedded in said roadway and surrounding said transmitting coil, the said receiving coil being large relative to said transmitting coil so as to effect loose coupling between the magnetic field produced by said core and said receiving coil;

(d) a capacitor shunting said receiving coil and forming therewith a circuit resonant at a frequency higher than the frequency of said oscillator, whereby the voltage induced in said receiver coil by the field produced by said transmitter coil will decrease upon the presence of a vehicle;

(e) a resistor and capacitor voltage storing circuit having an appreciable time constant connected in circuit with said receiving coil, operable responsive to a persistent decrease in the output response of said coil to alter its voltage charge in accordance with the change, and operable responsive to any increase in the output response to alter its charge instantaneously;

(f) means interconnecting said oscillator and said voltage storing circuit to control the frequency of said oscillator in response to the magnitude of the charge on said capacitor; and (g) means responsive to the decrease in the output of said receiving coil for manifesting the presence of a vehicle on the roadway in the vicinity of the receiving coil.

References Cited

UNITED STATES PATENTS 1,806,500    5/1931    Rice _____ 340—38

THOMAS B. HABECKER, *Primary Examiner.*